United States Patent
Han et al.

(10) Patent No.: US 12,137,704 B2
(45) Date of Patent: Nov. 12, 2024

(54) PEA PROTEIN HYDROLYSATE

(71) Applicant: Cargill, Incorporated, Wayzata, MN (US)

(72) Inventors: Sonia Han, Lauderdale, MN (US); Pam Ismail, Shoreview, IN (US); Paige Ties, Minneapolis, MN (US); Rachel Mitacek, Alpharetta, GA (US)

(73) Assignee: CARGILL, INCORPORATED, Wayzata, MN (US)

( * ) Notice: Subject to any disclaimer, the term of this patent is extended or adjusted under 35 U.S.C. 154(b) by 474 days.

(21) Appl. No.: 16/761,105

(22) PCT Filed: Nov. 2, 2018

(86) PCT No.: PCT/US2018/058830
§ 371 (c)(1),
(2) Date: May 1, 2020

(87) PCT Pub. No.: WO2019/090011
PCT Pub. Date: May 9, 2019

(65) Prior Publication Data
US 2022/0061353 A1  Mar. 3, 2022

(51) Int. Cl.
*A23J 3/34* (2006.01)
*A23L 2/66* (2006.01)
*A23L 33/18* (2016.01)

(52) U.S. Cl.
CPC ............... *A23J 3/346* (2013.01); *A23L 2/66* (2013.01); *A23L 33/18* (2016.08)

(58) Field of Classification Search
CPC .. A23L 2/66; A23L 33/18; A23L 33/00; A23J 3/346

USPC .......................................................... 426/46
See application file for complete search history.

(56) References Cited

U.S. PATENT DOCUMENTS

| 4,234,620 | A | 11/1980 | Howard |
| 4,959,350 | A | 9/1990 | Frokjaer |
| 5,520,935 | A | 5/1996 | Eriksen |
| 9,149,063 | B2 | 10/2015 | Dhalleine et al. |

(Continued)

FOREIGN PATENT DOCUMENTS

| BR | 112018015417 B1 | 12/2022 |
| CN | 1625965 A | 6/2005 |

(Continued)

OTHER PUBLICATIONS

JP2017158572A Machine translation (Year: 2017).*

(Continued)

*Primary Examiner* — Subbalakshmi Prakash (57) ABSTRACT

A composition and method of preparing a pea protein hydrolysate includes obtaining a pea protein composition, adding a fungal protease to the pea protein composition, and hydrolyzing the pea protein composition to a degree of hydrolysis of about 4% or greater to obtain a pea protein hydrolysate. In an example, the degree of hydrolysis can range from about 4% to about 25% at a pH ranging from about 5 to about 7.5 and at a temperature ranging from about 30° C. to about 60° C. The resulting pea protein hydrolysate has a solubility of at least 30% at pH 3.4, a viscosity of at least 65 cPs at pH 3.4, a dispersibility of at least 115 seconds at about neutral pH, and a suspendability of at least 1.5 TSI Global at pH 3.4.

19 Claims, 5 Drawing Sheets

(56) References Cited

U.S. PATENT DOCUMENTS

| | | | |
|---|---|---|---|
| 2008/0305212 A1 | 12/2008 | Wong | |
| 2011/0097448 A1 | 4/2011 | Wong et al. | |
| 2011/0165305 A1* | 7/2011 | Lynglev | A23L 33/18 435/68.1 |
| 2011/0305740 A1 | 12/2011 | Boursier | |
| 2013/0017310 A1 | 1/2013 | Dhalleine | |
| 2013/0274324 A1 | 10/2013 | Deng | |
| 2013/0287912 A1 | 10/2013 | De Waele | |
| 2014/0314944 A1 | 10/2014 | Duvet et al. | |
| 2015/0237885 A1 | 8/2015 | Boursier | |
| 2017/0208853 A1 | 7/2017 | Gallardo et al. | |
| 2018/0075589 A1 | 3/2018 | Winzell | |
| 2019/0021387 A1 | 1/2019 | Barata | |
| 2020/0154753 A1* | 5/2020 | Barata | A23L 33/19 |

FOREIGN PATENT DOCUMENTS

| | | | |
|---|---|---|---|
| CN | 102387710 A | 3/2012 | |
| CN | 102387711 A | 3/2012 | |
| JP | 2006512371 A | 4/2006 | |
| WO | 9425580 | 11/1994 | |
| WO | 2004057976 A1 | 7/2004 | |
| WO | WO-2017129921 A1 * | 8/2017 | A23C 11/06 |

OTHER PUBLICATIONS

"Protease M "Amano" SD", Food Processing Use, 1-2.
"Protein Processing", https://www.amano-enzyme.co.jp/eng/productuse/protein.html, Oct. 9, 2017, 1-2.
Karamac, Magdalena , "Effect of Temperature and Enzyme/Substrate Ration on the Hydrolysis of Pea Protein Isolates by Trypsin", Czech J. Food Sci., vol. 20, No. 1, Jun. 23, 2001, 1-6.
"Protein processing," Wikipedia [Online], retrieved from the Internet: <URL: https://www.amano-enzyme.co.jp/eng/productuse/protein.html>, retrieved on Oct. 9, 2017, 2 pages.
Amano Enzyme Inc., "Protease M'Amano' SD," 2 pages, 2015.
"Nutralys S85F" Pea protein isolate product specification sheet, Aug. 18, 2020 (Aug. 18, 2020), Retrieved from the Internet: URL: https://www.roquette.com/-/media/roquette-sharepoint-libraries/sdolproduct-specification-sheet/roquettequalTtyspecification-sheetnutralys-s85f-10212006en.pdf, 2 pages.
Barac et al., "Functional Properties of Pea (*Pisum sativum*, L.) Protein Isolates Modified with Chymosin," International Journal of Molecular Sciences, 2011, pp. 8372-8387.
Cheung et al., "Enzymatic production of protein hydrolysates from steelhead (*Oncorhynchus mykiss*) skin gelatin as inhibitors of dipeptidyl-peptidase IV and angiotensin-I converting enzyme", Journal of Functional Foods, 28 (2017) 254-264.
EDC Protease—Enzecor Fungal Protease [retrieved from Internet on Jun. 28, 2023] § 'Enzeco® Fungal Protease' URL: retrieved from the Internet: URL: <https://www.enzymedevelopment.com/proteases/>, 1 page.
Fuhrmeister et al., "Impact of processing on functional properties of protein products from wrinkled peas", Journal of Food Engineering 56 (2003) 119-129.
Liang et al. "pH-dependent emulsifying properties of pea [*Pisum sativum* (L.)] proteins", Food Hydrocolloids 33 (2013) 309-319.
Ji, Heli <China Food Additives and Ingredients Handbook>, China Quality Inspection Publishing House China Standards Press, 1st edition, Jun. 2016, p. 272.
Karamac et al., "Effect of temperature and enzyme/substrate ratio on the hydrolysis of pea protein isolates by trypsin," Czech journal of food sciences, 20(1):1-6, Feb. 28, 2002.
McCarthy et al., "Emulsification properties of pea protein isolate using homogenization, microfluidization and ultrasonication", Food Research International 89 (2016) 415-421.
Shand et al., "Physicochemical and textural properties of heat-induced pea protein isolate gels", Food Chemistry 102 (2007) 1119-1130.
Jiang et al., "Modifying the physicochemical properties of pea protein by pH-shifting and ultrasound combined treatments", Ultrasonics Sonochemistry, 2017, vol. 38, p. 835-842. Available online Mar. 28, 2017.
Bader et al., "Can protein functionalities by enhanced by high-pressure homogenization?—A study on functional properties of lupin proteins", Procedia Food Science 1 (2011) 1359-1366.
Soetrisno et al., "Functional Properties of Acid and Salt Extracted Proteins of Yellow Peas (*Pisum sativum* L. Miranda)", J. Agric. Food Chem. 1992, 40, 975-980.
Zheng, Jianxian, <Biotechnology in Functional Foods>, China Light Industry Press, 1st edition, Jan. 2004, pp. 253-256.

* cited by examiner

PEA PROTEIN HYDROLYSATE

CROSS REFERENCE TO RELATED APPLICATIONS

This application is a national phase application of PCT/US18/058830, filed 2 Nov. 2018, entitled PEA PROTEIN HYDROLYSATE, which claims the benefit of priority to U.S. Provisional Application No. 62/581,359, filed 3 Nov. 2017, entitled PEA PROTEIN HYDROLYSATE, which are hereby incorporated by reference in their entirety.

TECHNICAL FIELD

The present patent application relates to the field of pea protein for use in food products. More particularly, the present application relates to pea protein hydrolysates with high solubility, a method of preparing the same, and beverages containing the same.

BACKGROUND

Peas are a high-quality nutritional food rich in starch, protein and crude fiber. Pea protein is a nutritionally balanced vegetable protein rich in lysine and further comprising a variety of essential amino acids needed by the human body. Pea protein is suitable for use in health products and as an additive in foods or beverages. Pea protein may be an attractive protein source for some consumers, particularly vegetarians, including vegans.

Despite the enhanced interest in pea protein for use in health products, foods and beverages, pea protein products continue to face challenges in terms of solubility of the pea protein and flavor. As such, market acceptance of pea protein, particularly in foods and beverages, remains relatively low.

OVERVIEW

The present inventors recognize, among other things, an opportunity for a pea protein hydrolysate having improved solubility, as well as favorable taste and texture, for use in various beverage applications.

Examples according to the present application can include a method of preparing a pea protein hydrolysate. The method can comprise obtaining a pea protein composition (i.e. the starting material), adding an enzyme, in preferred aspects a fungal enzyme, and in more preferred aspects a fungal enzyme derived from *Aspergillus oryzae*, to the pea protein composition at a ratio from about 0.5:100 to about 1.5:100 by weight of fungal enzyme to pea protein, and hydrolyzing the pea protein composition to a degree of hydrolysis ranging from about 4% to about 25%, at a pH ranging from about 5 to about 7.5 and at a temperature ranging from about 30° C. to about 60° C., to obtain a pea protein hydrolysate. The resulting pea protein hydrolysate can have a solubility of at least 50% at about pH 3.4 or 7. The pea protein composition (the starting material that undergoes hydrolysis) can be a pea protein concentrate or isolate.

In an example, the resulting solubility of the pea protein hydrolysate can be at least 55% at pH about 3.4 or about 7. In an example, the resulting solubility can be at least 60% at pH about 3.4 or about 7. In an example, the resulting solubility can be at least 65% at pH about 3.4 or about 7. In an example, the resulting solubility can range between about 50% and about 70% at pH about 3.4 or 7.

In an example, the degree of hydrolysis of the pea protein hydrolysate can range from about 4% to about 25%. In an example, the degree of hydrolysis of the pea protein hydrolysate can range from about 6% to about 20%. In an example, the degree of hydrolysis can range from about 8% to about 18%. In an example, the degree of hydrolysis can range from about 4% to about 10%. In an example, the degree of hydrolysis can range from about 16% to about 25%. In an example, the degree of hydrolysis can be about 8%. In an example, the degree of hydrolysis can be about 18%.

In an example, hydrolyzing the pea protein composition can be performed at a temperature between about 40 degrees Celsius and about 50 degrees Celsius. In an example, hydrolyzing the pea protein composition can be performed at a pH ranging between about 5.5 and about 6.5. In an example, a time for hydrolyzing the pea protein composition is between about 30 minutes and about 70 minutes.

In an example, the ratio of enzyme to pea protein is about 1:100. In an example, the enzyme is a protease and a selected strain of fungus is *Aspergillus oryzae*.

In an example, the starting material/pea protein composition can include at least one of a native pea protein and a modified pea protein. It is recognized that the starting material/pea protein composition may not be 100% pea protein. In an example, the pea protein composition can comprise at least 80 weight percent pea protein.

Examples according to the present application can include a pea protein hydrolysate comprising a solubility of at least 30% at pH about 3.4 or about 7. In an example, the solubility can be at least 40% at pH about 3.4 or about 7. In an example, the solubility can be at least 50% at pH about 3.4 or about 7. In an example, the solubility can be at least 60% at pH about 3.4 or about 7. In an example, the solubility can range between about 50% and about 70% at pH 3 about 3.4 or about 7. In an example, the pea protein hydrolysate can be at least 80 weight percent protein.

Examples according to the present application can include a pea protein hydrolysate comprising a viscosity of at least 65 centipoise at pH about 3.4 or 7. Examples according to the present application can include a pea protein hydrolysate comprising a dispersibility of at least 115 seconds at about neutral pH. Examples according to the present invention can include a pea protein hydrolysate comprising a suspendability comprising at least 1.5 TSI global at pH about 3.4 or 7.

Examples according to the present application can include use of the pea protein hydrolysates described above in a beverage. In an example, a beverage containing the pea protein hydrolysate can be a water-based beverage in which at least 45 weight percent of the beverage is water. In an example, the pea protein hydrolysate can comprise at least 5 weight percent of the beverage. In an example, the beverage containing the pea protein hydrolysate can have a viscosity ranging from about 100 centipoise to about 165 centipoise when viscosity is measured at room temperature or ambient conditions after stirring for about 15 minutes. Because the beverage containing the pea protein hydrolysate can be stored in a refrigerator prior to such viscosity measurement, the beverage can undergo a high temperature short time treatment, which can include heating to about 190° F. for about 90 seconds, prior to the viscosity measurement. In an example, the viscosity of the beverage containing the pea protein hydrolysate can range from about 100 centipoise to about 200 centipoise when measured under the conditions immediately above.

When used in a beverage formulation, the pea protein hydrolysates described herein can provide a protein source that complies with a vegetarian (including vegan) diet, while still providing a beverage with favorable flavor, texture and overall taste. The beverage can have a low viscosity and be stable over a typical shelf life for the beverage.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present application provides a method of preparing a pea protein hydrolysate having a solubility of at least 50% at about pH 3.4 or 7. The enhanced solubility of the pea protein hydrolysate described herein can facilitate use of the pea protein hydrolysate in food and beverages. In addition to enhanced solubility, the pea protein hydrolysate can improve an overall taste of the protein beverage, as compared to other comparable protein beverages, as well as provide an esthetic benefit to the protein beverage it is contained within. Moreover, the pea protein hydrolysate can have a viscosity that results in satisfactory texture and mouthfeel and can be stable for a shelf-life of the beverage. As demonstrated below, the pea protein hydrolysate can facilitate a favorable tasting beverage at pea protein inclusion levels equal to or greater than 5% by weight. As such, in some cases, the beverage can be offered as providing a good or excellent source of protein.

The method of preparing the pea protein hydrolysate can include obtaining a pea protein composition, adding a fungal enzyme to the pea protein composition and hydrolyzing the pea protein composition under controlled conditions to form a pea protein hydrolysate at a desired degree of hydrolysis. The pea protein composition (i.e. the starting form of the pea protein before hydrolysis) can be a pea protein concentrate or isolate and can also be pea flour. As water is added to the combination of pea protein composition/fungal enzyme, the fungal enzyme can cleave the bonds in the pea protein. The fungal enzyme can be a fungal protease. Note that the term "enzyme" means a composition having an active enzyme product. One skilled in the art will appreciate such enzyme activity and inclusion level can be varied within an enzyme product.

As used herein, the term "pea protein composition" refers to a composition that comprises a pea protein that has not undergone hydrolysis. The pea protein composition has a protein content of 100% protein or less. In some aspects, the pea protein content in the pea protein composition ranges from greater than 60%, greater than 70%, and greater than 80% protein content. The pea protein composition can be in either dry powder or in slurry form. The slurry form can be made from (1) the dry powder form previously described mixed with water such that the dry powder makes up about 5-10 wt % of the slurry with water making up the remainder or (2) a pea protein process intermediate slurry comprising 14-18% dry solids suspended therein. Note that if the pea protein composition is in slurry form, additional homogenization at high shear may be used during processing. As used herein, the term "pea protein hydrolysate" or "hydrolysate" refers to a pea protein composition that has undergone limited hydrolysis under controlled conditions. The present application describes a method of performing hydrolysis of a pea protein composition. As such, the pea protein composition can be referred to herein as the starting material.

The following conditions during hydrolysis can influence, at least in part, the degree of hydrolysis (DH): time, temperature and pH. In an example, the hydrolysis process can run from about 30 minutes to about 70 minutes. In an example, the hydrolysis process can run at a temperature ranging from about 30 degrees Celsius to about 60 degrees Celsius. In an example, the temperature ranges between about 40 degrees Celsius and about 50 degrees Celsius. In an example, the hydrolysis process can run at a pH ranging from about 5.0 to about 7.5. In an example, the pH ranges between about 5.5 and about 6.5. As discussed below, an experimental design was used to determine favorable hydrolysis conditions for the pea protein composition.

The degree of hydrolysis (DH) is defined as the proportion of cleaved peptide bonds in the hydrolysate. In an example, the pea protein hydrolysates described herein can have a DH ranging from about 4% to about 25%. In an example, the DH can range from about 4% to about 10%. In an example, the DH can range from about 8% to about 12%. In an example, the DH can range from about 16% to about 25%. In an example, the DH of the pea protein hydrolysate can be about 8%, which is a common DH value for protein sources used in food and beverages applications. In an example, the DH of the pea protein hydrolysate can be about 18%.

In an example, the pea protein hydrolysate can be available in a powder form. The powder composition of the pea protein hydrolysate can contain less than 100% pea protein. In an example, the powder composition of the pea protein hydrolysate can contain about 80% pea protein by weight.

In an example, enzyme can be added at a ratio from about 0.05:100 to about 5:100 (by weight) of enzyme to pea protein. In an example, the ratio of enzyme to pea protein can be from about 0.5:100 to about 1.5:100 (by weight). In an example, the ratio of enzyme to pea protein can be about 1:100 (by weight). An increase in the amount of enzyme, relative to pea protein, can decrease the time required to achieve a particular degree of hydrolysis.

Because the pea protein composition (i.e. starting material that undergoes hydrolysis) can contain less than 100% pea protein, the ratio of enzyme to pea protein composition is higher. In an example, if the pea protein composition contains 80% pea protein by weight, at a ratio of 1:100 enzyme to pea protein, the ratio of enzyme to pea protein composition is 1:120 (by weight). In other words, at the enzyme to pea protein ratio of 1:100, 1 gram of enzyme is mixed with 120 grams of pea protein composition (starting material). This is under an assumption that the pea protein composition (starting material) is 80 wt % pea protein. In an example, the pea protein composition (the starting material) can be in a powder form.

In preferred aspects, the enzyme is a fungal enzyme. The fungal enzyme can be a protease to cleave the pea protein. In an example, the fungal enzyme can be Protease M "Amano" SD from Amano Enzyme Inc. In an example, the fungus can be *Aspergillus oryzae*.

The pea protein composition can include a native pea protein, a modified pea protein or a combination thereof. For purposes herein, a modified pea protein refers to a protein that has been treated (chemically or physically) to achieve a targeted functionality. Typically the treatment includes a heat treatment during extraction and drying.

The pea protein hydrolysate can be included as a protein source in a variety of beverages, including dairy or non-dairy applications. Such beverages can include, but are not limited to, juice, protein drinks, energy drinks, etc. In an example, the pea protein hydrolysate within the beverage can be 5 grams per 8 ounce serving. In an example, the pea protein hydrolysate can be used in combination with whey, and the combined protein can be 10 grams per 8 ounce serving.

In an example, the pea protein hydrolysate in the beverage can be about 5% by weight, or greater. As described in the Examples below, when used in beverage formulations, the pea protein hydrolysate exhibited favorable sensory results, at DH 8 and DH 18. As such, inclusion of the pea protein hydrolysate in the beverage at levels greater than 5% by weight are feasible.

As described above, a pea protein composition can undergo hydrolysis to enhance solubility. As such, solubility can be a function of the degree of hydrolysis (DH) of the resulting pea protein hydrolysate. An increase in DH can result in an increase in solubility.

Protein solubility can be defined as the concentration of the protein that is present in the liquid phase relative to the amount of protein that is present in the liquid and solid phase at equilibrium. Protein solubility can be reported as a percentage and is often determined by measuring protein content in the supernatant after applying centrifugal force to a solution prepared at specific protein content, pH and salt concentration, relative to the total protein in the solution prior to centrifugation.

The pea protein hydrolysates described herein can have a solubility of at least 50% at about pH 3.4. It is noted that the majority of the solubility analysis of the pea protein hydrolysates described herein was done at pH equal to 3.4, which is a difficult pH level for the hydrolysate. In an example, the solubility of the pea protein hydrolysate at pH 3.4 ranges between about 30% and about 70%. It is desirable that the solubility of a pea protein hydrolysate at a neutral pH (about 7) is equal to or greater than the solubility of such pea protein hydrolysate at pH 3.4. The enhanced solubility of the pea protein hydrolysate can facilitate higher inclusion levels of the pea protein in various beverages.

Examples according to the present application can include a pea protein hydrolysate comprising a viscosity of at least 65 centipoise at pH about 3.4 or 7. In an example, the viscosity can be at least 80 centipoise at pH about 3.4 or 7. In an example, the viscosity can be at least 90 centipoise at pH about 3.4 or 7. In an example, the viscosity can be at least 100 centipoise at pH about 3.4. In an example, the viscosity can be at least 110 centipoise at pH about 3.4. Viscosity is measured using a Rapid Visco Analyzer (RVA) by stirring a 5 gram powder (i.e., hydrolysate), 20 gram water solution at 200 rpm for 10 minutes.

Examples according to the present application can include a pea protein hydrolysate comprising a dispersibility of at least 115 seconds at about neutral pH. In an example, the dispersibility can be at least 125 seconds at about neutral pH. In an example, the dispersibility can be at least 135 seconds at about neutral pH. Dispersibility marks the amount of time needed until powder (i.e., hydrolysate) is completely wetted and clumps are easily dispersed. Powder needed to achieve a 5% protein concentration solution is added to 100 ml of water at room temperature. The timer is immediately started and the solution is stirred at 120 rpm in one direction.

Examples according to the present invention can include a pea protein hydrolysate comprising a suspendability comprising at least 1.5 TSI Global at pH about 3.4 or 7. In an example, the suspendability can be at least 5 TSI Global at pH about 3.4 or 7. In an example, the suspendability can be at least 7 TSI Global at pH about 3.4. Suspendability is measured using the Turbiscan Stability index (TSI) Global, a 5% protein concentration solution is prepared and measured for 45 minutes in a Turbiscan with the final TSI Global reading reported as the suspendability measurement.

Experimental Design to Determine Hydrolysis Conditions

An experimental design was used to determine hydrolysis conditions that maximize solubility and provide appropriate viscosity for beverages. Hydrolysate samples were made at various values for pH, temperature and time. The pH ranged from 3 to 8, the temperature ranged from 35 to 55° C., and the time ranged from 20 to 100 minutes.

The hydrolysate samples were tested for DH, solubility (measured at pH 3.4), heat stability and viscosity. The results of the tests were entered into a model, which was used to make two predictions. For one prediction, a target DH of 8% was imposed and the conditions to achieve the maximum solubility at that DH value were calculated. In the second, prediction, the target DH value was set to 18%. The predicted conditions for each set are shown in Table 1 below.

TABLE 1

Samples of Pea Protein Hydrolysate

| Sample | DH | pH | Temp (° C.) | Time (min) | Ratio of enzyme to pea protein* |
|---|---|---|---|---|---|
| 1 | 8 | 6.4 | 40 | 32 | 1:100 |
| 2 | 18 | 5.5 | 47 | 68 | 1:100 |

*This is the amount (by weight) of pea protein in the pea protein composition (starting material). The pea protein composition was 80% pea protein (by weight).

The DH of sample 1 was constrained; in other words, the DH was set at 8%, since this is a common DH of protein compositions, as also stated above. The DH of sample 2 was unconstrained and the value shown in Table 1 is the DH value selected by the model. The hydrolysates for each sample were formed under the conditions in Table 1. Each sample was tested in triplicate to determine DH and solubility, as compared to the DH and solubility predicted by the model. The results are shown in Table 2 below. The actual values below are an average of the three values for each sample. This demonstrates that repeated production of the hydrolyzed ingredient was generally reproducible.

TABLE 2

Comparison of Actual and Predicted values for DH and Solubility

| Sample | DH % Predicted | DH % Actual | Solubility (heated at pH 3.4) Predicted | Solubility (heated at pH 3.4) Actual |
|---|---|---|---|---|
| 1 | 8 | 10.52 | 56.3 | 55.4 |
| 2 | 18 | 19.63 | 69.3 | 67.1 |

DH was measured for each sample using the O-Phthaldialdehyde(OPA) method and corrected by subtracting DH value of unhydrolyzed sample. In order to measure solubility, a 5% protein solution was made and adjusted to the desired pH (3.4) and allowed to stir for an hour. A homogenous aliquot was sampled and tested for protein content. Another homogenous aliquot was sampled and centrifuged for 10 minutes at 13,000 rpm. The supernatant was then sampled and tested for protein content. All protein content testing was done using the Dumas method. The protein content after centrifugation was divided by the protein content prior to centrifugation and multiplied by 100% to calculate the percent of soluble protein.

Two beverage formulations containing a pea protein hydrolysate were formulated and tested, as described below, and compared to a pea protein composition that did not undergo hydrolysis.

The present application will be further described in the following examples, which do not limit the scope of the invention in the claims.

EXAMPLES

For examples 1 and 2 below, at least one pea protein hydrolysate was made from a pea protein composition and the resulting hydrolysate was tested in a beverage and compared with a beverage containing a pea protein composition that did not undergo hydrolysis. In both examples below, the starting material for the pea protein (i.e. pea protein composition) was PURISPea™870 from World Food Processing. To form the pea protein hydrolysates, the pea protein composition was hydrolyzed using Protease M "Amano" SD from Amano Enzyme Inc. at the 1:100 enzyme to pea protein ratio provided above and at the conditions determined in the experimental design and shown in Table 1.

Example 1—Beverage Formulation with Pea Protein and Whey Protein

A beverage containing a pea protein hydrolysate at DH 8 was compared with the same beverage containing Puris™ Pea Protein 870 (note that the hydrolysate was prepared using a pea protein composition starting material of 5 wt % Puris™ Pea Protein 870 and a remainder of water). In this example, the two pea protein samples (hydrolysate at DH 8 and Puris™ Pea Protein 870) were each used with a whey protein isolate to evaluate how the pea protein would perform in combination with whey protein. The formulation of the beverage (referred to as Beverage Formulation 1) is shown below in Table 3.

TABLE 3

| Beverage Formulation 1 | |
|---|---|
| Ingredient | Percent |
| Water | 45 |
| Fruit Puree | 32 |
| Fruit Juice Concentrate | 13 |
| Pea Protein (Puris ™ Pea Protein 870 or pea protein hydrolysate) | 4 |
| Whey Protein Isolates | 3 |
| Acid | 1 |
| Natural Flavoring | 1 |
| Stabilizer | 1 |
| Total | 100 |

It is worth noting that the samples under Beverage Formulation 1 provide 10 grams of protein per 8 ounce serving, which can, in some instances, facilitate a label claiming "Excellent Source of Protein".

Figure 1:
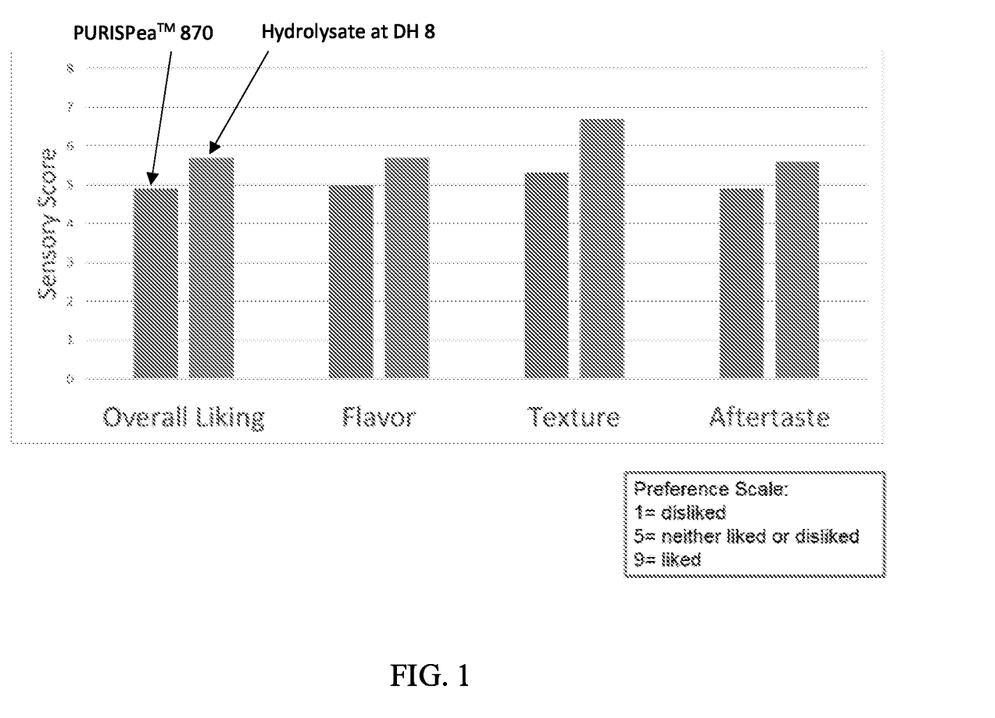
FIG. 1 is a plot of sensory results from food panelists for two samples of a beverage formulation containing pea protein and whey protein, and the pea protein was different between the two samples.

The two samples underwent homogenization after the ingredients in Table 3 were mixed together. Homogenization was performed at 2500 psi. The samples then underwent processing through a MicroThermics unit, which included a high temperature short time (HTST) step (heating to about 190° F.), and then passing through another in line homogenizer at 2500 psi. The evaluation of the samples for Beverage Formulation 1 included sensory testing using 26 food panelists. Samples were given to the panelists individually and in random order. Panelists were asked to score samples based on overall liking, flavor, texture and aftertaste. The results of the sensory panel are shown in FIG. 1. The pea protein hydrolysate sample resulted in a favorable score from the panelists for all four characteristics and a higher score for all four characteristics, as compared to Puris™ Pea Protein 870.

The samples under Beverage Formulation 1 also underwent an eight-week shelf life study. The samples were stored in clear plastic bottles in a refrigerator. The samples were removed from the refrigerator to perform testing/observations. At week 4, the pea protein hydrolysate sample displayed visible separation from the outside. However, upon shaking, all separation was gone and the beverage had a smooth texture.

Viscosity, color and pH were also measured weekly for each of the samples over the eight-week study. The results are shown in Tables 4-6 below.

Prior to taking the viscosity measurements, the samples underwent the high temperature short time HTST) treatment of heating to 190° F. for about 90 seconds. Viscosity was measured using an RVA (Rapid Visco Analyser) at room temperature with stirring for about 15 minutes. The viscosity value (in centipoise) was recorded once the measured viscosity leveled out.

TABLE 4

Viscosity for Beverage Formulation 1

| Sample | Week 1 | Week 2 | Week 3 | Week 4 | Week 5 | Week 6 | Week 7 | Week 8 |
|---|---|---|---|---|---|---|---|---|
| Puris ™ Pea Protein 870 | NA | NA | 205.95 | 231.2 | 234.55 | 218.6 | 228.8 | 231.15 |
| Pea protein hydrolysate (DH 8) | NA | NA | 158.35 | 132.45 | 143.95 | 144.95 | 132.85 | 134.55 |

TABLE 5 pH for Beverage Formulation 1

| Sample | Week 1 | Week 2 | Week 3 | Week 4 | Week 5 | Week 6 | Week 7 | Week 8 |
|---|---|---|---|---|---|---|---|---|
| Puris ™ Pea Protein 870 | 3.55 | 3.52 | 3.5 | 3.6 | 3.47 | 3.69 | 3.71 | 3.7 |
| Pea protein hydrolysate (DH 8) | 3.58 | 3.64 | 3.54 | 3.65 | 3.5 | 3.74 | 3.83 | 3.87 |

TABLE 6

Color (a* value) for Beverage Formulation 1

| Sample | Week 1 | Week 2 | Week 3 | Week 4 | Week 5 | Week 6 | Week 7 | Week 8 |
|---|---|---|---|---|---|---|---|---|
| Puris ™ Pea Protein 870 | NA | 14.93 | 13.05 | 12.61 | 12.17 | 11.56 | 11.01 | 10.8 |
| Pea protein hydrolysate (DH 8) | NA | 13.71 | 12.31 | 11.58 | 11.05 | 10.8 | 10.48 | 10.15 |

Over the eight week study, the viscosity of the hydrolysate sample remained generally stable and was significantly lower than the Puris™ Pea 870 sample. The higher pH of the beverage formulated with pea protein hydrolysate could be attributed to the presence of whey protein in the beverage formulation.

The color measurements for the samples were obtained using a colorimeter, specifically Hunter Lab Labscan XE (serial number LX17983). In Table 6, only a* values for green-red color are shown here since this was the most relevant dimension for the beverage. The results indicate a natural breakdown over time that is acceptable from a consumer standpoint.

Example 2—Beverage Formulation with Pea Protein

In this example, referred to as Beverage Formulation 2, the whey protein isolate was eliminated from the formulation to evaluate how the pea protein hydrolysate (note that the hydrolysate was prepared using a pea protein composition starting material of 5 wt % Puris™ Pea Protein 870 and a remainder of water) would perform alone as the protein source. Beverage Formulation 2 is shown in Table 7 below.

TABLE 7

Beverage Formulation 2

| Ingredient | Percent |
|---|---|
| Water | 47 |
| Fruit Puree | 32 |
| Fruit Juice Concentrate | 13 |
| Pea Protein (Puris ™ Pea Protein 870 or pea protein hydrolysate) | 5 |
| Acid | 1 |
| Natural Flavoring | 1 |
| Stabilizer | 1 |
| Total | 100 |

Whey protein was excluded from the ingredients in Beverage Formulation 2, but the other ingredients are similar to Beverage Formulation 1. Three pea protein samples were evaluated for Beverage Formulation 2-pea protein hydrolysate at DH 8, pea protein hydrolysate at pH 18, and Puris™ Pea 870. Beverage Formulation 2 provides 5 grams of protein per 8 ounce serving, which can, in some instances, facilitate a label claiming "Good Source of Protein".

The beverages were processed used the same conditions and steps provided above under Example 1.

Figure 2:
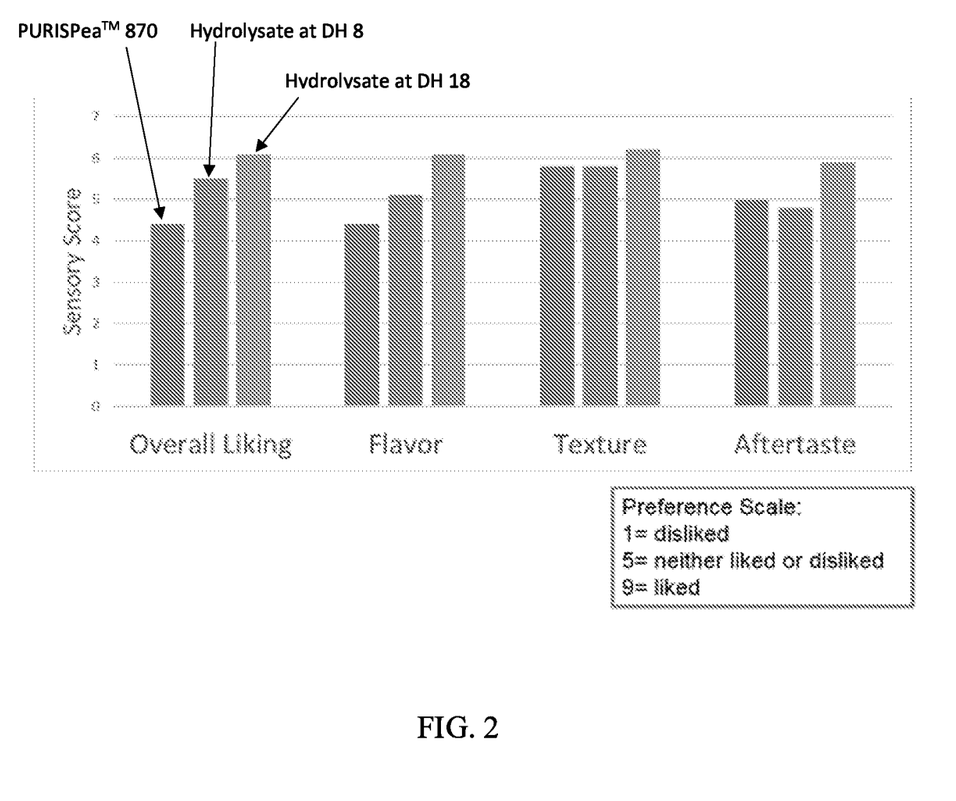
FIG. 2 is a plot of sensory results from food panelists for three samples of a beverage formulation containing pea protein, and the pea protein was different for each of the three samples.

Sensory testing of the three samples was performed by 22 food panelists. Samples were given to the panelists individually and in random order. Panels evaluated and scored each sample based on overall liking, flavor, texture and aftertaste. The results of the sensory panel are shown in FIG. 2. The two pea protein hydrolysate samples (at DH 8 and DH 18) performed well relative to the Puris™ Pea 870 sample. More specifically, the pea protein hydrolysate at DH 8 scored higher or about as well as Puris™ Pea Protein 870 in each category. The pea protein hydrolysate at DH 18 scored higher than Puris™ Pea Protein 870 across all categories.

Based on the sensory results shown in FIG. 2, the DH 18 hydrolysate performed better than the DH 8 hydrolysate. Despite the higher degree of hydrolysis, it does not appear that the DH18 hydrolysate resulted in an overall bitter flavor of the beverage. Rather, the DH 18 hydrolysate provided a soluble pea protein powder that provided a favorable tasting beverage, with a favorable mouthfeel.

The samples under Beverage Formulation 2 underwent an eight-week shelf life study. The samples were stored in clear plastic bottles in a refrigerator and then removed for testing/observations. All samples showed visible separation at week 4. The Puris™ Pea Protein 870 sample had similar separation which included particulates floating in the watery phase; such separation was less obvious when the bottle was opened. The pea protein hydrolysate samples had a "stringy" texture, which appeared foamy when the bottle was opened. For all samples, separation went away upon shaking and the beverages had a smooth texture.

Viscosity, color and pH were measured for each of the samples over an eight week study. Viscosity was measured (in centipoise) using the process described above under Beverage Formulation 1. The results are shown in Tables 8-10 below.

TABLE 8

Viscosity for Beverage Formulation 2

| Sample | Week 1 | Week 2 | Week 3 | Week 4 | Week 5 | Week 6 | Week 7 | Week 8 |
|---|---|---|---|---|---|---|---|---|
| Puris™ Pea Protein 870 | NA | 177.15 | 165.15 | 167 | 154.25 | 165.55 | 163.05 | 166.5 |
| Pea protein hydrolysate-DH 8 | NA | 124.4 | 120.35 | 122.4 | 138.2 | 119.95 | 123.45 | 121 |
| Pea protein hydrolysate-DH 18 | NA | 128.3 | 131.25 | 120.05 | 134.3 | 133.6 | 135.25 | 137.65 |

TABLE 9 pH for Beverage Formulation 2

| Sample | Week 1 | Week 2 | Week 3 | Week 4 | Week 5 | Week 6 | Week 7 | Week 8 |
|---|---|---|---|---|---|---|---|---|
| Puris™ Pea Protein 870 | 3.38 | 3.36 | 3.36 | 3.3 | 3.44 | 3.43 | 3.31 | 3.4 |
| Pea protein hydrolysate-DH 8 | 3.51 | 3.5 | 3.51 | 3.41 | 3.4 | 3.63 | 3.51 | 3.62 |
| Pea protein hydrolysate-DH 18 | 3.53 | 3.5 | 3.54 | 3.48 | 3.59 | 3.71 | 3.55 | 3.6 |

TABLE 10

Color (a* value) for Beverage Formulation 2

| Sample | Week 1 | Week 2 | Week 3 | Week 4 | Week 5 | Week 6 | Week 7 | Week 8 |
|---|---|---|---|---|---|---|---|---|
| Puris™ Pea Protein 870 | 19.78 | 18.03 | 17.93 | 16.99 | 16.57 | 16.17 | 15.38 | 14.65 |
| Pea protein hydrolysate-DH 8 | 18.78 | 16.96 | 16.46 | 15.46 | 15.09 | 14.91 | 14.13 | 13.32 |
| Pea protein hydrolysate-DH 18 | 18.69 | 16.39 | 16.27 | 15.29 | 15.26 | 14.5 | 13.7 | 13.28 |

The viscosity of both hydrolysate samples remained generally stable over the eight-week study and was markedly lower than the Puris™ Pea 870 sample. The pH of both hydrolysate samples remained relatively constant over the eight-week study, although minimally higher than the Puris™ Pea 870 sample.

Color measurements for the three samples here were obtained using the same colorimeter used under Example 1. In Table 10, only a* values for green-red color are shown. All three of the samples exhibited a similar decrease in color over the eight-week study and such change is acceptable.

The pea protein hydrolysate samples exhibited good solubility and low viscosity, especially relative to the Puris™ Pea 870 sample. The pea protein hydrolysate samples also exhibited superior flavor and texture, particularly the sample at DH equal to 18, as compared to the Puris™ Pea 870 sample. The inventors believe that the fungal enzyme used in the hydrolysis process described herein targets specific sites on the protein resulting in the release of hydrophilic peptides that are not perceived as bitter, and may in fact minimize pea protein off-flavor within a beverage formulation. The shelf life study indicated that the hydrolysates are relatively stable over time and maintained low viscosity. Given the favorable taste results, viscosity and stability, the pea protein hydrolysates described herein can be used in a variety of beverage applications, including those beverages described as being a protein drink.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

Example 3—Properties of Pea Protein Hydrolysate

Figure 3:
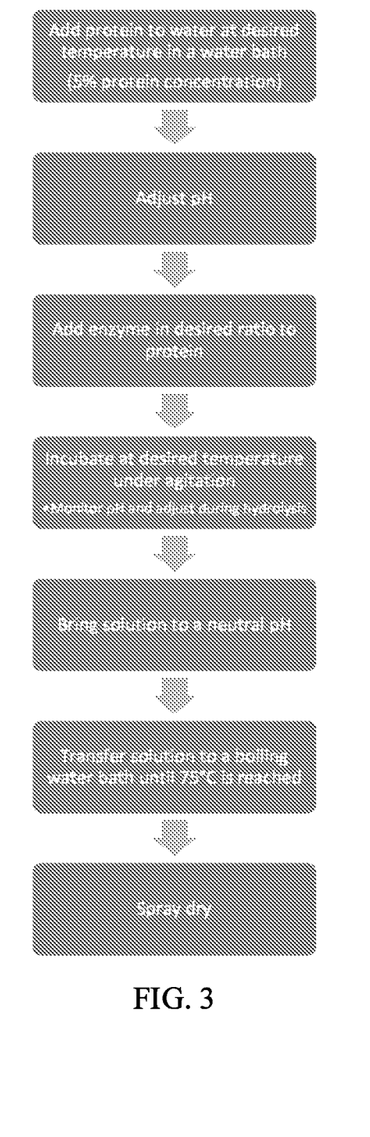
FIG. 3 illustrates a bench scale method of preparing the pea protein hydrolysate.
Figure 4:
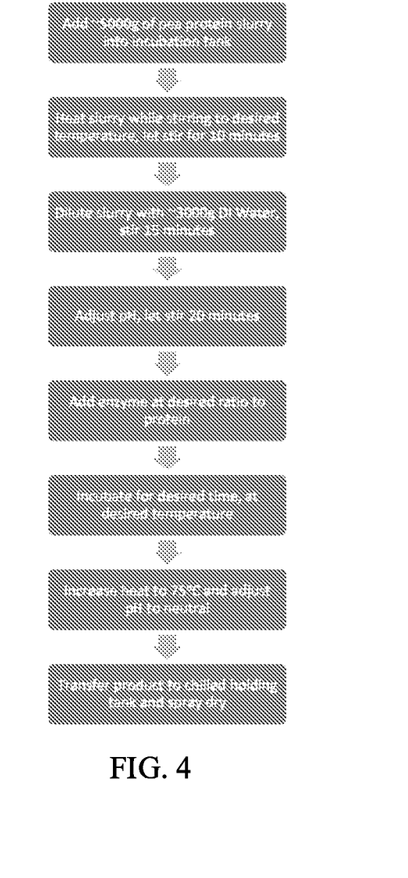
FIG. 4 illustrates a pilot scale method of preparing the pea protein hydrolysate.
Figure 5:
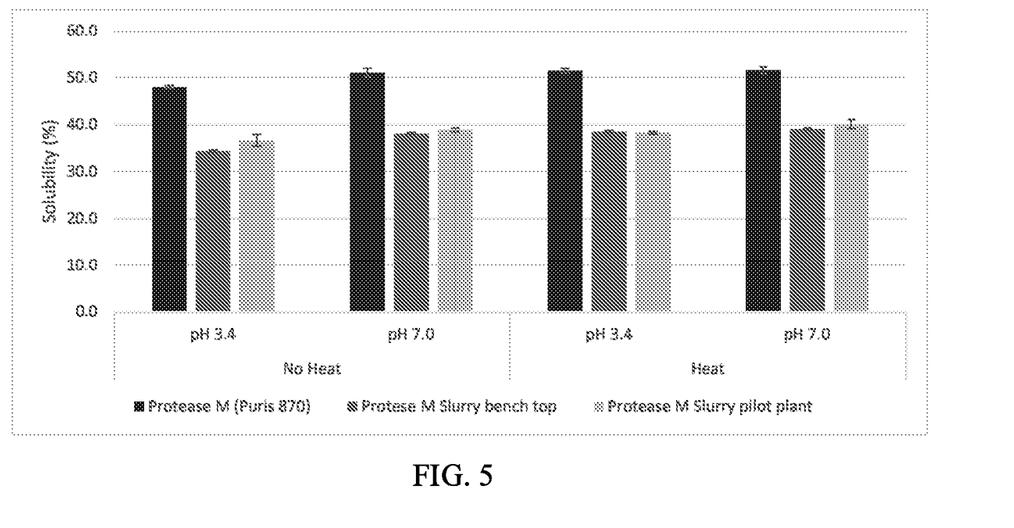
FIG. 5 illustrates solubility of hydrolysates when the pea protein composition starting material varies.

In this example, the starting material for the pea protein (i.e., pea protein composition) was a variation of PURISPea™870 from World Food Processing before being spray dried in slurry form and the other starting material was a non-pasteurized native pea protein slurry (extracted from pea flour (PURISWhole™) using alkaline solubilization and acid precipitation). To form the pea protein hydrolysates, the three pea protein compositions were hydrolyzed using Protease M "Amano" SD from Amano Enzyme Inc. at the 1:100 enzyme to pea protein ratio at the conditions illustrated in FIGS. 3 and 4 to a DH 8. Tables 11, 12, 13, and 14 provide solubility, viscosity, dispersibility, and suspendability data, respectively, for the resulting pea protein hydrolysates.

TABLE 11

Solubility Data of Pea Protein Hydrolysate in percent solubility in a 5% protein solution (Heat treatment at 85° C. for 30 minutes)

| | | Benchtop Slurry Trial DH 8 | Pilot Slurry Trial DH 8 | Native Slurry DH 8 |
|---|---|---|---|---|
| No Heat | pH 3.4 | 34.3 | 36.7 | 33.58 |
| | pH 7.0 | 38.1 | 38.9 | 60.65 |
| Heat | pH 3.4 | 38.4 | 38.3 | 38.5 |
| | pH 7.0 | 39.1 | 40.1 | 60.25 |

TABLE 12

Viscosity Data of Pea Protein Hydrolysate in centipoise in a 20% w/v solution

| | Benchtop Slurry Trial DH 8 | Pilot Slurry Trial DH 8 | Native Slurry DH 8 |
|---|---|---|---|
| pH 3.4 | 112.4 | 102.6 | 68.2 |
| pH 7 | 98.3 | 94.5 | 71.0 |

TABLE 13

Dispersibility Time of Pea Protein Hydrolysate
in seconds in a 5% protein solution

| | | Benchtop Slurry Trial DH 8 | Pilot Slurry Trial DH 8 | Native Slurry DH 8 |
|---|---|---|---|---|
| Neutral pH | Time in seconds | 127.50 | 117.79 | 137.24 |

Amount of time (seconds) it takes for the protein sample to completely disperse in water under constant stirring at 120 rpm.

TABLE 14

Suspendability Data of Pea Protein Hydrolysate
in TSI Global in a 5% protein solution

| | Benchtop Slurry Trial DH 8 | Pilot Slurry Trial DH 8 | Native Slurry DH 8 |
|---|---|---|---|
| pH 7.0 | 5.32 | 1.89 | NA, was freeze dried and does not allow for suspendability testing |
| pH 3.4 | 7.58 | 1.14 | NA, was freeze dried and does not allow for suspendability testing |

The values reported are the difference in the transmission of light over 45 minutes. A higher value indicates that more light is transmitted, indicating that the protein is settling out at the bottom of the container.

Example 4—Enzyme Profile Analysis

In this example, enzyme profiles are assessed to determine their effects on the outcome of modification. Commercial proteases are commonly mixtures of catalytic capabilities derived from multi-specificity individual enzymes and mixtures of enzymes of different specificity. Both the presence and absence of functionalities effects the outcome of enzyme modification. To understand the effects of an enzyme modification of a protein, it is beneficial to understand something about the mix and intensity of specific hydrolytic activities in an enzyme product. There are a potentially large number of ways to characterize an enzyme product, so a limited set of activities provide a practical description without being too time-consuming to execute. The following methods were used to assess activity in this invention. As used in this example, any reference to "enzyme" is a reference to the "enzyme product" which includes additional non-enzymatic components.

General Hydrolysis of Azocasein at pH 7

Azocasein (Sigma A2765) was used as a substrate to detect non-specific protease activity. A 2 wt % solution of azocasein was prepared in 50 mM $KH_2PO_4$—NaOH. The reaction mixture was composed by adding 0.5 mL of the same buffer to a 2 mL centrifuge tube. Tubes were set up for 0, 10, 20 and 30 minute time points. The time-zero tubes were placed on ice immediately after adding 50 µL of 100 wt % trichloroacetic acid in water. A 50 µL aliquot of diluted enzyme was added to each tube and the tubes were warmed in a 50° C. water bath. At timed intervals, 0.4 mL of the azocasein solution was added and a timer begun. Blanks were prepared but with 50 µL of buffer replacing the enzyme. At the designated time points, 50 µL of 100 wt % TCA was added to stop the reaction and stopped reactions immediately transferred to an ice bath.

Enzyme was diluted (or dissolved and diluted) into the reaction buffer described above. A range of dilutions were tested to demonstrate assay linearity with enzyme concentration. Only dilutions where the rate of pigment release was linear were included in subsequent analyses.

When all samples had been stopped, samples were centrifuged for 7.5 minutes at 16,000×g to sediment the unreacted protein.

A 100 µL aliquot of the supernatant was placed in the well of a 96-place microplate reader. To each well, 100 µL of buffer and 100 µL of 1M NaOH was added. The plate was read at 440 nm with a BioTek Synergy HT using Gen 5.1.11 software. The enzyme-free blanks were used to create a mean blank value which was subtracted from all "active" cells; any negative values were set to zero for time point 0. The slope of the change in absorbance was calculated.

One unit of activity was defined as a one unit change in $\Delta A_{440}$/min. To derive the units/g of commercial enzyme product, the activities for each dilution were plotted against the mass of enzyme in the assay and the regression line of activity versus enzyme was computed. The slope represents the activity/mg enzyme product, which was converted to $\Delta A_{440}$/min/g enzyme product. Individual enzyme assay linearity was checked before inclusion in the analysis.

General Hydrolysis of Bovine Serum Albumin at pH 7

Bovine serum albumin, BSA, (Sigma A2153-50G) was used as a substrate to measure non-specific protease activity. A solution of 10 mg/mL BSA in 25 mM sodium phosphate buffer was prepared at pH 7. The enzyme was prepared by serial dilution in 25 mM sodium phosphate buffer at pH 7. Microcentrifuge tubes were labeled and arranged by enzyme concentration and time points (0, 10, 20, and 30 min). Using an autopipette, 950 µL BSA solution was added to each tube. The time-zero tubes were immediately placed in an ice bath and all other tubes placed in a water bath set to 50° C. to equilibrate. To inhibit enzyme activity and precipitate the protein, 50 µL 100% wt trichloroacetic acid (TCA) in water was added to the time-zero tubes. 50 µL of the appropriate enzyme solution was added to each time-zero tube. Once the 10, 20, and 30 min time point tubes were equilibrated, 50 µL of the appropriate enzyme solution was added, at timed intervals, to the corresponding tube. The timer was started at the first enzyme addition. Blanks were prepared with 50 µL buffer replacing the enzyme solution. At the appropriate time point, 50 µL 100% wt TCA was added to stop the reaction, the tube was removed from the water bath, shaken, and placed in an ice bath for at least 30 min. Samples were then centrifuged at 9100×g for 10 min.

To obtain accurate readings at 280 nm, the pH of the supernatant was adjusted to approximately 9.0. Sodium hydroxide (120 µL 0.5M) was added to each well of a UV-transparent 96-well microplate. 190 µL supernatant was added to the wells and the plate was gently agitated to mix. The plate was read at 280 nm using a microplate reader with Gen5 software.

The supernatants were also analyzed for free amino acids using TNBS (2,4,6-trinitrobenzene sulfonic acid). Prior to analysis a 0.5% solution of TNBS in ultra-pure water was prepared and stored in the refrigerator until use. Using a micropipette, 50 µL of each standard solution (0-6 mM Leucine in 0.01N HCl) was pipetted, in duplicate, into a 96 deep well plate. A 40 µL aliquot of each sample (supernatant) was transferred to the deep well plate along with 10 µL 2.5% borate reagent at pH 9.5. Using a multi-channel pipette, 1 mL of the 2.5% borate reagent was added to each standard and sample well. To begin the reaction, 20 µL 0.5% TNBS was added to each well and a silicone cover was placed on the plate to seal individual wells. The plate was shaken to mix and placed, at room temperature, in the dark to develop. After 30 min, the cover was removed and 500 μL of freshly prepared 1M monobasic sodium phosphate was added to each well to stop the reaction. The plate was shaken again with a silicone cover and a 300 μL aliquot of each standard and sample solution was transferred to a 96 well microplate. The absorbance at 420 nm was measured and the leucine-equivalent concentration calculated using the averaged standard curves. One unit of activity was defined as the release of 1 μmol Leu-equiv./min. To derive the units/g of commercial enzyme product, the activities for each dilution were plotted against the mass of enzyme in the assay and the regression line of activity versus enzyme was computed. The slope represents the activity/g enzyme product.

Glycine-Specific Hydrolysis

Enzyme activity specific to cleavage at glycine was tested using a synthetic chromophoric substrate. A 1 mM solution of glycine 4-nitroanilide-HCl (Sigma G4254) was prepared by dissolving 5 mg in 0.25 mL of DMSO and then diluting to 25 mL with 25 mM Na-HEPES-HCl (pH 6.75). Enzyme was prepared by serial dilution into the ice-cold 25 mM HEPES buffer. A 100 μL aliquot of enzyme was added to the well of a 96-place microtiter plate. Reaction was initiated by addition of 100 μL of the substrate solution. The plate was placed into a 50° C. (pre-heated) BioTek Synergy HT device running Gen 5.1.11 software. The absorbance at 405 nm was measured at 0, 10, and 20 minutes after shaking.

One unit of activity was defined as a one unit change in $\Delta A_{405}$/min. To derive the units/g of commercial enzyme product, the activities for each dilution were plotted against the mass of enzyme in the assay and the regression line of activity versus enzyme was computed. The slope represents the activity/mg enzyme product, which was converted to $\Delta A_{405}$/min/g enzyme product. Individual enzyme assay linearity was checked before inclusion in the analysis.

Leucine-Specific Hydrolysis

Enzyme activity specific to cleavage at leucine was tested using a synthetic chromophoric substrate. A 1 mM solution of L-Leucine-p-nitroanilide (Sigma L2158) was prepared by dissolving 6.3 mg in 0.25 mL of DMSO and then diluting to 25 g with 25 mM Na-HEPES-HCl (pH 6.75). Enzyme was prepared by serial dilution into the 25 mM HEPES buffer. A 100 μL aliquot of enzyme was added to the well of a 96-place microtiter plate. Reaction was initiated by addition of 100 μL of the substrate solution. The plate was placed into a 50° C. (pre-heated) BioTek Synergy HT device running Gen 5.1.11 software. The absorbance at 405 nm was measured at intervals from 0 to 30 minutes after shaking.

One unit of activity was defined as a one unit change in $\Delta A_{405}$/min. To derive the units/g of commercial enzyme product, the activities for each dilution were plotted against the mass of enzyme in the assay and the regression line of activity versus enzyme was computed. The slope represents the activity/mg enzyme product, which was converted to $\Delta A_{405}$/min/g enzyme product. Individual enzyme assay linearity was checked before inclusion in the analysis.

Lysine-Specific Hydrolysis

Enzyme activity specific to cleavage at lysine was tested using a synthetic chromophoric substrate. A 1 mM solution of L-Lysine p-nitroanilide dihydro-bromide (Sigma L7002) was prepared by dissolving 11 mg in 0.25 mL of DMSO and then diluting to 25 g with 25 mM Na-HEPES-HCl (pH 6.75). Enzyme was prepared by serial dilution into the 25 mM HEPES buffer. A 100 μL aliquot of enzyme was added to the well of a 96-place microtiter plate. Reaction was initiated by addition of 100 μL of the substrate solution. The plate was placed into a 50° C. (pre-heated) BioTek Synergy HT device running Gen 5.1.11 software. The absorbance at 405 nm was measured in intervals from 0 to 30 minutes after shaking.

One unit of activity was defined as a one unit change in $\Delta A_{405}$/min. To derive the units/g of commercial enzyme product, the activities for each dilution were plotted against the mass of enzyme in the assay and the regression line of activity versus enzyme was computed. The slope represents the activity/mg enzyme product, which was converted to $\Delta A_{405}$/min/g enzyme product. Individual enzyme assay linearity was checked before inclusion in the analysis.

Methionine-Specific Hydrolysis

Enzyme activity specific to cleavage at methionine was tested using a synthetic chromophoric substrate. A 10 mM solution of L-methionine p-nitroanilide (Sigma M3529) was prepared by dissolving 4.8 mg in 1.78 mL of acetone. Enzyme was prepared by serial dilution into ice-cold 25 mM MOPS buffer (pH 7.5). A 50 μL aliquot of enzyme was added to the well of a 96-place microtiter plate together with 130 μL of the buffer at room temperature. Reaction was initiated by addition of 20 μL of the substrate solution. The plate was placed into a 50° C. (pre-heated) BioTek Synergy HT device running Gen 5.1.11 software. The absorbance at 405 nm was measured in intervals from 0 to 45 minutes after intermittent shaking.

One unit of activity was defined as a one unit change in $\Delta A_{405}$/min. To derive the units/g of commercial enzyme product, the activities for each dilution were plotted against the mass of enzyme in the assay and the regression line of activity versus enzyme was computed. The slope represents the activity/mg enzyme product, which was converted to $\Delta A_{405}$/min/g enzyme product. Individual enzyme assay linearity was checked before inclusion in the analysis.

Arginine-Specific Hydrolysis

Enzyme activity specific to cleavage at arginine was tested using a synthetic chromophoric substrate. A 10 mM solution of Na-Benzoyl-L-arginine 4-nitroanilide hydrochloride (Sigma B4875) was prepared by dissolving ~10 mg of substrate in 0.25 mL DMSO and then diluting to 25 g with 25 mM Na-HEPES (pH 6.75). Enzyme was prepared by serial dilution into ice-cold 25 mM Na-HEPES (pH 6.75). A 100 μL aliquot of enzyme was added to the well of a 96-place microtiter plate. Reaction was initiated by addition of 100 μL of the substrate solution. The plate was placed into a 50° C. (pre-heated) BioTek Synergy HT device running Gen 5.1.11 software. The absorbance at 405 nm was measured in intervals from 0 to 15 minutes after intermittent shaking.

One unit of activity was defined as a one unit change in $\Delta A_{405}$/min. To derive the units/g of commercial enzyme product, the activities for each dilution were plotted against the mass of enzyme in the assay and the regression line of activity versus enzyme was computed. The slope represents the activity/mg enzyme product, which was converted to $\Delta A_{405}$/min/g enzyme product. Individual enzyme assay linearity was checked before inclusion in the analysis.

Tyrosine-Specific Hydrolysis

Enzyme activity specific to cleavage at tyrosine was tested using a synthetic chromophoric substrate. A 10 mM solution of Na-Benzoyl-L-arginine 4-nitroanilide hydrochloride (Sigma B4875) was prepared by dissolving 11.6 mg of substrate in 2.32 mL acetone. Enzyme was prepared by serial dilution into ice-cold 25 mM MOPS-HCl (pH 7.5). An aliquot of 350 μL of room temperature buffer plus 100 μL of diluted enzyme was added to microfuge tubes. Reaction was initiated by adding 50 μL of substrate. Tubes were mixed and moved to a 50° C. water bath. The reaction was stopped at 1, 3.5 and 23 hours by addition of 50 μL of 100% w/w TCA and the tubes were chilled until all samples were collected. For the time-zero point, the TCA was added before addition of substrate. When finished, samples were centrifuged at 16,000 g for 7.5 minutes to settle precipitated protein and unreacted substrate. Samples (200 µL) were loaded onto a 96 well microtiter plate and read on a BioTek Synergy HT device running Gen 5.1.11 software. The absorbance at 405 nm was recorded. This reaction was very slow so the only data point used for further analysis was that at 23 hours. As a check, pancreatin was also tested against the substrate in the same buffer system and showed a delta A405 of greater than 0.63 within the first hour.

One unit of activity was defined as a one unit change in $\Delta A_{405}/23$ hours. To derive the units/g of commercial enzyme product, the activities for each dilution were plotted against the mass of enzyme in the assay and the regression line of activity versus enzyme was computed. The slope represents the activity/mg enzyme product, which was converted to $\Delta A_{405}/23$ hr/g enzyme product.

The activities of Protease M in this set of assays is shown in Table 15.

TABLE 15

Activities of Protease M

| Substrate | Units | Activity (SE) |
|---|---|---|
| Azocasein | $\Delta A_{440}$/min/g | 200 (17) |
| Bovine serum albumin | $\Delta A_{280}$/min/g | 53.4 (2.8) |
| Bovine serum albumin | µmol Leu-equiv.min/g | 17.3 (0.5) |
| glycine 4-nitroanilide-HCl | $\Delta A_{405}$/min/g | 0.535 (0.023) |
| L-Leucine-p-nitroanilide | $\Delta A_{405}$/min/g | 10,399 (714) |
| L-Lysine p-nitroanilide dihydro-bromide | $\Delta A_{405}$/min/g | 1283 (44.9) |
| L-methionine 4-nitroanilide | $\Delta A_{405}$/min/g | 90.8 (4.2) |
| Nα-Benzoyl-L-arginine 4-nitroanilide hydrochloride | $\Delta A_{405}$/min/g | 2.28 (0.12) |
| Nα-Benzoyl-L-tyrosine 4-nitroanilide hydrochloride | $\Delta A_{405}/23$ hr/g | 35.9 (5.0) |

In an example where 1 g of Protease M is applied to 100 g of protein substrate, the activity being applied could also be described as about: 200 azocasein-degrading units, 53 casein-derived A280-releasing units, 17 casein-derived alpha amine-releasing units, 0.54 glycine nitroanilide hydrolyzing units, 10,400 leucine nitroanilide hydrolyzing units, 1280 lysine nitroanilide hydrolyzing units, 91 methionine nitroanilide hydrolyzing units, 2.3 benzoylarginine nitroanilide hydrolyzing units and 36 benzoyl tyrosine nitroanilide hydrolyzing units. One skilled in the art would recognize that other measures of enzyme general and specific activity could be used to further specify the enzymatic activity profile being applied to achieve the results of this invention.

The claimed invention is:

1. A method of preparing a pea protein hydrolysate, comprising:
    obtaining a pea protein composition;
    adding an enzyme to the pea protein composition at a ratio from about 0.05:100 to about 5:100 by weight of enzyme to pea protein;
    hydrolyzing the pea protein composition at a pH ranging from about 5 to about 7.5 and at a temperature ranging from about 30° C. to about 60° C., to obtain a pea protein hydrolysate with a degree of hydrolysis ranging from about 4% to about 25%,
    wherein the pea protein hydrolysate has a solubility of at least 30% at pH 3.4, a viscosity of at least 65 centipoise at pH 3.4, a dispersibility of at least 115 seconds at about neutral pH, and/or a suspendability of at least 1.5 TSI Global at pH 3.4;
    wherein the enzyme is a fungal enzyme from *Aspergillus oryzae* having an EC number EC 3.4.23.18 and having an activity described by 200 azocasein-degrading units, 53 casein-derived A280-releasing units, 17 casein-derived alpha amine-releasing units, 0.54 glycine nitroanilide hydrolyzing units, 10,400 leucine nitroanilide hydrolyzing units, 1280 lysine nitroanilide hydrolyzing units, 91 methionine nitroanilide hydrolyzing units, 2.3 benzoylarginine nitroanilide hydrolyzing units or 36 benzoyl tyrosine nitroanilide hydrolyzing units.

2. The method of claim 1 wherein the pea protein composition comprises a native pea protein.

3. The method of claim 1 wherein the pea protein composition comprises a modified pea protein.

4. The method of claim 1 wherein the ratio is from about 0.5:100 to about 5:100 enzyme to pea protein.

5. The method of claim 1 wherein the ratio is about 1:100 enzyme to pea protein.

6. The method of claim 1 wherein the pea protein composition comprises at least 80 wt % pea protein.

7. The method of claim 1 wherein the degree of hydrolysis ranges from about 6% to about 10%.

8. The method of claim 1 wherein the degree of hydrolysis ranges from about 16% to about 25%.

9. The method of claim 1 wherein the pea protein hydrolysate has a solubility of at least 55% at pH 3.4.

10. The method of claim 1 wherein the pea protein hydrolysate has a solubility of at least 60% at pH 3.4.

11. The method of claim 1 wherein the hydrolyzing temperature is between about 40° C. and about 50° C.

12. The method of claim 1 wherein the hydrolyzing pH is between about 5.5 and about 6.5.

13. The method of claim 1 wherein a time for hydrolyzing the pea protein composition is between about 30 minutes and about 70 minutes.

14. A pea protein hydrolysate comprising a solubility of at least 30% at pH 3.4, a viscosity of at least 65 centipoise at pH 3.4, a dispersibility of at least 115 seconds at about neutral pH, and/or a suspendability of at least 1.5 TSI Global at pH 3.4, wherein the pea protein hydrolysate has been hydrolyzed in an enzymatic hydrolysis wherein the enzyme is a fungal enzyme from *Aspergillus oryzae* having an EC number EC 3.4.23.18 and having an activity described by 200 azocasein-degrading units, 53 casein-derived A280-releasing units, 17 casein-derived alpha amine-releasing units, 0.54 glycine nitroanilide hydrolyzing units, 10,400 leucine nitroanilide hydrolyzing units, 1280 lysine nitroanilide hydrolyzing units, 91 methionine nitroanilide hydrolyzing units, 2.3 benzoylarginine nitroanilide hydrolyzing units or 36 benzoyl tyrosine nitroanilide hydrolyzing units.

15. The pea protein hydrolysate of claim 14 wherein the solubility is at least 60% at pH 3.4.

16. The pea protein hydrolysate of claim 14 wherein the solubility ranges from about 50% to about 70% at pH 3.4.

17. The pea protein hydrolysate of claim 14 comprising at least 80 wt % protein.

18. A beverage comprising the pea protein hydrolysate of claim 14.

19. The beverage of claim 18, wherein the pea protein hydrolysate comprises at least 5 weight percent of the beverage.

* * * * *